July 29, 1947.    L. H. JONES    2,424,693
PACKAGING CHEESE CURD
Filed June 9, 1943
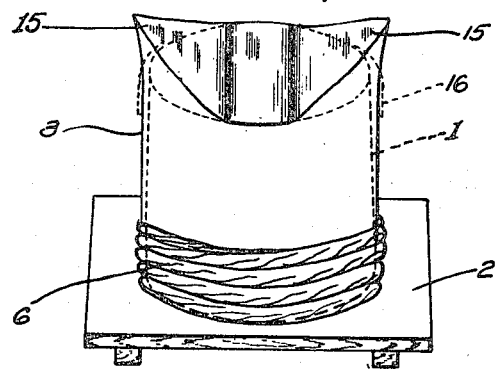
Fig. 1
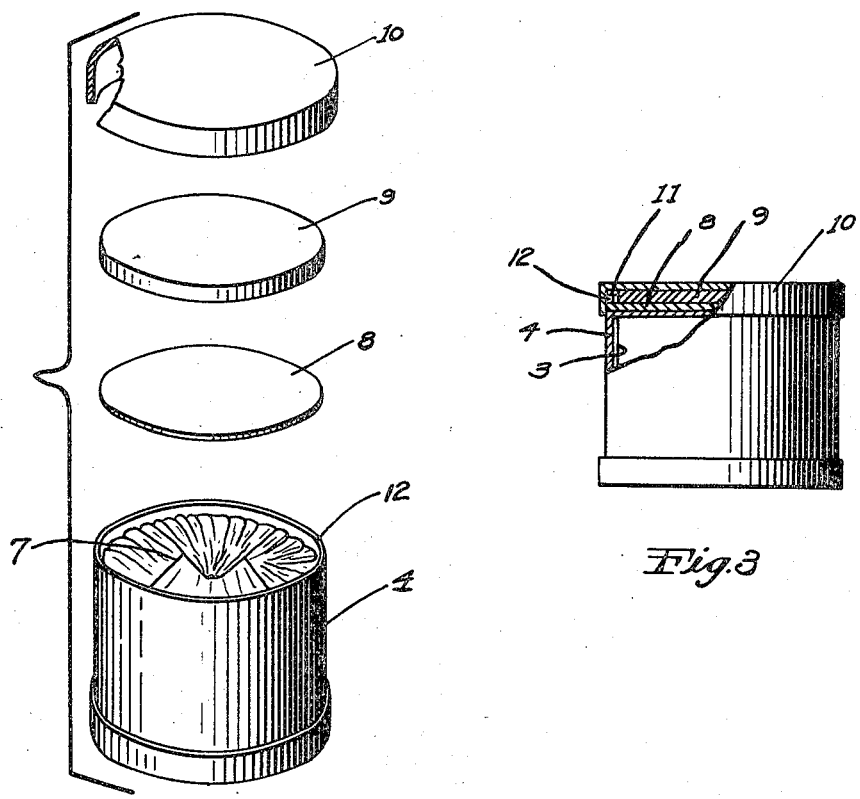
Fig. 2
Fig. 3
Inventor
Lewis H. Jones
By
Attorney Patented July 29, 1947

2,424,693

UNITED STATES PATENT OFFICE 2,424,693

PACKAGING CHEESE CURD

Lewis H. Jones, Chicago, Ill., assignor to Wingfoot Corporation, Akron, Ohio, a corporation of Delaware Application June 9, 1943, Serial No. 490,175

3 Claims. (Cl. 99—178)

This invention relates to the curing of cheese cheddars and, more particularly, to the packaging of them as a step in the process of curing.

The curing of Cheddar cheese and like cheeses in a thin, limp, moistureproof and oil-resistant wrapper under pressure has been described in Davis application Serial No. 469,423, filed December 18, 1942. That application describes, particularly, the wrapping of small blocks of such cheeses in sheets of such wrapping material, nesting them in a wooden box or the like, and subjecting them to pressure therein, and curing them while thus subjected to pressure. The film wrapper preserves the moisture content of the cheese, and by using a limp wrapper and maintaining the cheese under pressure in a box or other suitable container during the curing period and thereafter in storage, the cheese is maintained in an air-free condition and is thus kept free from mold.

In spite of many months of experimentation by various persons, no commercially successful method of applying this process to large cheddars had been devised prior to this invention. According to this invention, large cheddars and, also, small cheddars, including "flats," "twins," "daisies," "longhorns," "squares," etc., as soon as the press cloth or closing-up cloth is removed, are covered with a preformed encircling wrapper—i. e., a tube or bag of thin, limp, moistureproof and oil-resistant wrapping material—and subjected to pressure to render them air free; and then they are cured under pressure in an air-free condition and may be subsequently stored in this manner until ready for use or sale.

On removal of the pressure cloth from the cheese curd, the cheese settles, rapidly losing shape. It is, therefore, necessary that the cheddar be covered quickly and placed in some container. Working rapidly, it is possible to cover such a cheddar with single sheets of film material although the labor cost is high. When the covered cheddar is placed in a wooden or fiberboard box for curing, the opacity of the box makes it impossible to determine whether any of the covering sheets have been displaced during insertion in the box. If a sheet has been displaced, the exposed cheese will dry out and mold. It is not possible to determine whether any damage has been done until after the curing period, and then, of course, considerable spoilage has taken place with resultant loss.

By using a preformed encircling wrapper, such as a tube or bag, and covering an end of the cheddar with a portion of the enclosure material the cheddar may be quickly covered, and there is every assurance that the cheese is well covered and that it is maintained in a covered condition throughout the curing period.

The invention will be further described in connection with the accompanying drawing in which Fig. 1 shows the cheddar partially covered with the bag. Fig. 2 shows the covered cheddar in the curing box with a pressure plate, block, and cover in their relative positions, ready for packaging the cheese; and Fig. 3 shows the packaged cheese ready for curing and storage.

The fresh, uncured cheddar 1 is often somewhat tapered, as shown in the drawing. The invention is most advantageously applied to large cheddars of, for example, 60 to 100 pounds in weight or larger. The cheddar is placed on a platform 2, and here the press cloth is removed. This is preferably done the day after the cheddar is formed. The cheddar is soft and moist and will slump down if allowed to stand for any considerable period. It is, therefore, necessary that it be quickly enclosed. This is done by placing the bag 3 over it. The container 4 is then inverted over this, and the whole is then turned upside down. This is advantageously done by placing one hand under the platform and the other on the bottom of the container and turning the whole assembly upside down.

The container 4 may be a wooden box, or it may be a fiber-board container. It should be sufficiently rigid to permit pressure to be maintained on its contents. Usually, a cylindrical container will be employed although it is to be understood that the cheddar may vary in shape as well as in size. When the cheddar has been inverted, the excess bag material 6 is drawn up, preferably to its full height, and then folded over in the top of the container, as indicated by the numeral 7. It is not sealed but is merely folded over. This provides an outlet for exit of air and gases from the bag.

The pressure plate 8 is ordinarily made of the same material as the container; that is, it may be either wood or fiber board. The cheddar fits into the container rather snugly, and the pressure plate 8 fits the interior of the container almost exactly. This distributes any pressure applied to it rather evenly over the whole area of the cheddar and prevents the cheese from coming up around the pressure apparatus into the cover portion of the container.

The pressure block 9 is ordinarily made of wood. It is preferably somewhat smaller than the inside diameter of the container, as shown in Fig. 3. It is usually one-half or three-quarters inch in height, and its height and the size of the cheddar are so adjusted that when the pressure plate 8 and the pressure block 9 are placed on top of the cheddar, the top of the block 9 will be above the upper edge of the container even after the cheddar has settled and all air has been removed by pressure. This prevents the cover 10 from resting on the top edge of the container. The small space between the top edge 12 of the container and the cover is shown in Fig. 3 and indicated by the reference numeral 11. Therefore, by merely placing several containers on top of one another or by placing some other weight on top of the containers, their contents are placed under pressure. This forces the cheese covered by the thin film to assume the shape of the interior of the container and forces all entrapped air upwardly out under the cover of the container, and by maintaining the cheese under pressure during the curing operation and thereafter during storage, it is kept in an air-free condition. As long as the cheese is kept out of contact with the air, no mold will form.

In slipping the bag 3 over the cheese, some delay is necessitated, due to the necessity of allowing the entrapped air to escape. For this reason, it may be better to use a tube than a bag. If a tube is used, it will be folded over the top of the cheese in the position shown in Fig. 1 and will preferably be held together with an adhesive tape before the container is placed over it. If a bag is used, it may be an envelope type of bag made by folding a single sheet of film and then sealing each of the two edges adjacent the fold to form an envelope. Other types of envelope bags and bags of other structures may be used as is evident from the description of the use to which the bag is put. Openings may be provided in the bottom of the bag to permit the escape of air, provided no cheese is left exposed to the air. The openings may, for example, be provided in the ears 15, which are preferably folded down over the top of the cheddar, as indicated at 16, before the container is placed over the wrapped cheddar.

A preferred wrapping material for this purpose is a stretched rubber hydrochloride film, for example, film about .0004 inch thick. Thicker sheets up to, for example, .0006 inch or thicker may be used. If the sheet is too thick, it is stiff; and then, when folded down over the cheddar as, for example, in folding the ears over the edge of the cheddar, the film will "pipe," and these pipes will contain air; and this, of course, will cause formation of mold. If a thick film is used, it is almost impossible to remove air from any pipes which are formed. The thinner films are limp and fit snugly against the cheese, and any pipes which are formed are collapsed on the application of pressure, and the complete removal of air is easily accomplished.

Instead of using rubber hydrochloride film, metal foils, such as tin foil, etc., may be used. Coated sheets may be employed. The wax-rubber sheet known as Parafilm (manufactured by Menasha Products Company, of Menasha, Wisconsin) may be used if the package is at all times to be maintained at low temperatures.

Although the invention has been described more particularly as applied to the processing of Cheddar cheese, it applies equally well to the packaging of Colby cheese and to other cheeses which are processed in a manner similar to that used in the manufacture of Cheddar cheese.

What I claim is:

1. The method of curing cheddar-type cheese which comprises removing the press cloth from uncured cheese curd on a platform, immediately covering the cheese while still on the platform with a bag of a thin, limp, moisture proof and oil-resistant material before any substantial settling of the cheese has taken place, inverting a stiff container over the covered cheese, inverting the resulting assembly, removing the platform, covering the exposed portion of the cheese with a portion of the bag material, putting a lid on the container and before doing so, inserting a pressure device in the container over the cheese to prevent the lid of the container from resting on the top edge of the wall of the container so that on applying pressure, the pressure is transmitted to the cheese, and then applying pressure to force the cheese to assume the shape of the interior of the container and thus force entrapped air from the cheese and the container upwardly and out of the bag and thus render the cheese air free, and curing the cheese in the container under pressure in this air-free condition.

2. The process of curing cheddar-type cheese which comprises the removal of press cloth after the cheese curd has been pressed, enclosing the bare cheese curd in a preformed tube made of limp, moistureproof and air- and oil-resistant material by extending such preformed tube above and lowering to enclose said cheese, folding to close the tube, lowering an inverted cheese box of appropriate size and shape to enclose the tube-enveloped cheese and then inverting the resulting assembly so that the cheese box is in an open-end-up position, folding to close the tube at the open end of the box, inserting a snug fitting pressure plate on top of the folded tube, placing thereon a wooden block of such diameter as to ride freely within the box and of such thickness as to provide for holding the cover when placed thereon free from contact with the upper edge of the cheese box to permit pressure from other boxes of cheese placed above the cover to be exerted upon the wrapped cheese within the box to cause the cheese to settle in the box and flow out to fit the interior of the box, resulting in expulsion of all air from within the tube by force of the cheese against the walls, top, and bottom of the box with the tube material in between.

3. The process of curing cheddar-type cheese which comprises the removal of press cloth after cheese curd has been pressed, enclosing the bare cheese curd in a preformed bag made of limp, moistureproof and air- and oil-resistant material by extending such preformed bag above and lowering to enclose said cheese, thereafter lowering an inverted cheese box of appropriate size and shape to enclose the bag-enveloped cheese and then inverting the resulting assembly so that the cheese box is in an open-end-up position, folding to close the bag at the open end of the box, inserting a snug fitting pressure plate on top of the folded bag, placing thereon a wooden block of such diameter as to ride freely within the box and of such thickness as to provide for holding the cover when placed thereon free from contact with the upper edge of the cheese box to permit pressure from other boxes of cheese placed above the cover to be exerted upon the wrapped cheese within the box to cause cheese to settle in the box and flow out to fit the interior of the box, resulting in expulsion of all air from within the bag by force of the cheese against the walls, top, and bottom of the box with the bag material in between.

LEWIS H. JONES.

REFERENCES CITED

The following references are of record in the file of this patent:

UNITED STATES PATENTS

| Number | Name | Date |
|---|---|---|
| 1,981,986 | Bruhn | Nov. 27, 1934 |
| 1,925,443 | Gere | Sept. 5, 1933 |
| 1,992,821 | Gere | Feb. 26, 1935 |
| 2,081,637 | Doane | Oct. 22, 1935 |
| 2,109,093 | Rossman et al. | Feb. 22, 1938 |
| 2,266,700 | Abrams | Dec. 16, 1941 |
| 2,361,749 | Davis | Oct. 31, 1944 |

FOREIGN PATENTS

| Number | Country | Date |
|---|---|---|
| 115,894 | Australia | 1941 |